April 9, 1929.　　　　A. ALLEN　　　　1,708,074
INDICATING AND CONTROLLING METHOD AND MECHANISM
FOR PAPER MAKING MACHINES AND THE LIKE
Filed May 1, 1925　　　2 Sheets-Sheet 2

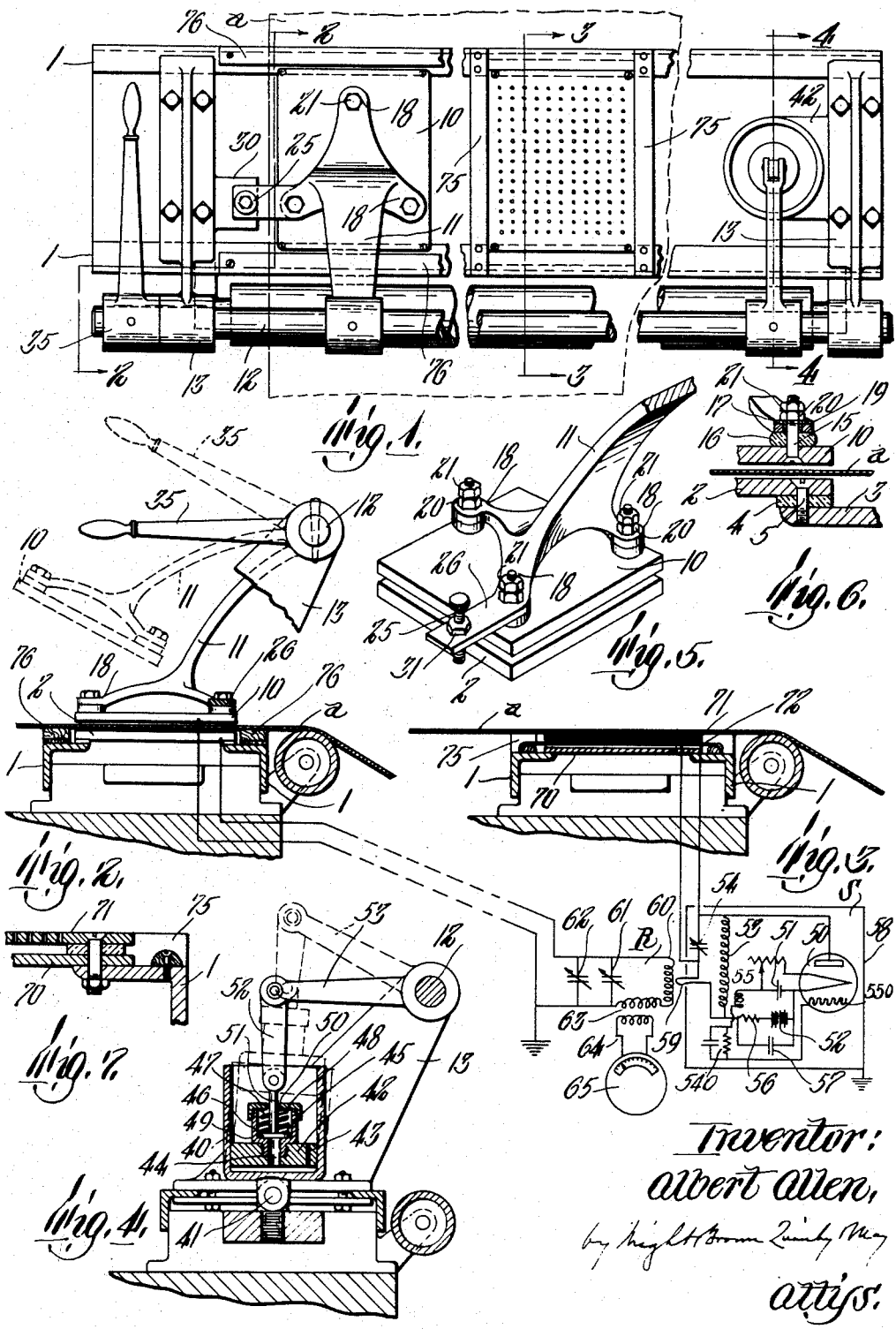

Inventor:
Albert Allen,

Patented Apr. 9, 1929.

1,708,074

UNITED STATES PATENT OFFICE.

ALBERT ALLEN, OF BANGOR, MAINE, ASSIGNOR, BY MESNE ASSIGNMENTS, TO ATLANTIC PRECISION INSTRUMENT COMPANY, OF BOSTON, MASSACHUSETTS, A CORPORATION OF MASSACHUSETTS.

INDICATING AND CONTROLLING METHOD AND MECHANISM FOR PAPER-MAKING MACHINES AND THE LIKE.

Application filed May 1, 1925. Serial No. 27,327.

This invention relates to mechanism particularly designed for ascertaining and indicating, and, if desired, for controlling the running weight of paper as it is being made, or other material, though it should be understood that certain features of the invention may find other important uses.

Heretofore it has been the usual practice to tear out portions from the web of paper, to dry these portions and test the bone dry tear-outs for weight, and if the results of such tests indicate a material variance from the weight of paper which it is desired to run, then to adjust the machine to vary the supply of pulp to the web-forming mechanism in a manner to effect a corrective change. A tear-out is then again made and tested for bone dry paper weight to determine whether this change is of the correct value to bring the weight of paper within the desired tolerance limits. After each such adjustment of the machine, several minutes elapse before its full effect is produced in the web and consequently much time is consumed and considerable paper is made before a proper adjustment may be assured. This method of arriving at a proper adjustment of the machine is therefore slow, tedious and often requires the return to the beater of considerable quantities of pulp which have been sheeted, due to the fact that the sheet as formed has not been of the desired weight. Even when the adjustment of the machine has been made, subsequent changes in operating conditions, which can not be avoided in practice, cause uncorrected variations in the weight of the paper produced, which often can not be detected except by making tear-outs from time to time and testing these tear-outs for bone dry weight. It is thus impossible to hold the sheet being formed to any high degree of uniformity and of course tear-outs cause blemishes in the web which result in much waste.

According to the present invention, a continuous ascertainment and indication of the weight of paper as formed in the web is obtained without the necessity of tearing out test pieces or affecting the web or its continuous manufacture in any way. Variations in the amount of pulp supplied may then be made by the machine tender in accordance with the indication at any desired time so that uniformity of weight within reasonable limits is readily attainable. Not only may such indication be made, but, if desired, mechanism may be controlled automatically in accordance with such indication to regulate the supply of pulp to the web-forming mechanism in such a way as to maintain the weight substantially constant regardless of considerable variations in operating conditions.

The invention, in the form herein illustrated and described, comprises a circuit which is sensitive to variations in the dielectric properties of the web and hence, as will be explained, to the unit area weight or mass of the web. I shall first briefly explain the principles of operation of an embodiment or practice of the invention and then describe in detail an electrical mechanism as it is employed for contonuously indicating the unit area weight, i. e. mass of a traveling web, e. g. paper, delivered from the dry end of a paper machine. If a pair of metal plates arranged in parallel spaced relation and separated by an air gap, thus forming a condenser, are introduced into an electric circuit, this condenser and the circuit including it will possess certain electrical characteristics, dependent on the area of the plates and their spacing. If now instead of an air gap between the plates, a different dielectric of the same thickness as the gap be introduced, the electrical characteristics (more especially, capacity,) are modified to an extent depending on the particular dielectric used. If, however, the areas and spacing of the plates remain unchanged, and dielectric material other than air and of less thickness than the gap be introduced, the effective dielectric between the plates comprises partly this material so introduced and the remainder the air in the spaces between the dielectric and the plates and any interstices of the dielectric, and the resultant electrical characteristics of the condenser are then intermediate those characteristics resulting from air gap alone and from the other dielectric alone, and approach those of the air alone, or the other dielectric alone, as the quantity of such other dielectric is small or large, respectively, relative to the quantity of the air between the plates. The quantity of the other dielectric being proportional to its mass, the change in electrical characteristics of the condenser from those where air is the sole dielectric thus becomes a function of the mass of the other dielectric between the plates.

If, in place of a stationary dielectric between the plates, this dielectric is in the form of a continuous web or sheet passed progressively between the plates, that mass of the web or sheet between the plates at any one instant is the determining factor for the electrical characteristics at that instant since all other factors remain constant. As the plate areas and the spacing of the plates are constant, the mass of the web therebetween is directly proportional to the weight of the web for unit length, assuming its composition as constant, and hence the changes in electrical characteristics become a measure of the changes of weight of the web.

Since one of the electrical characteristics of the condenser modified by the character and mass of the dielectric is capacity and as this is perhaps more susceptible of comparative measurement (by methods, one of which will be hereafter described,) than any other of the electrical characteristics so modified, it has been chosen for the purposes of this application for patent for indicating variations in the web being measured, though it should be understood that the invention in its broader aspects is not limited thereto. One of the several known methods of obtaining at least comparative measurements of capacity, and one by which small changes of capacity may be caused to effect a sufficiently marked visible indication to be of the requisite sensitivity, consists in using such changes in capacity to effect changes in the electrical characteristics of a current in which the condenser is placed, such as frequency changes in a high frequency oscillating electric circuit, and then detecting such changes in electrical characteristics. One method of detecting frequency changes is by noting changes in value of the tuning means, in this case a condenser, which are easily measured, in a coupled receiving or "pick up" circuit, necessary to tune it into resonance with the oscillating exciting or sending circuit, while another, and probably preferable method, is to fix the tuning of the receiving circuit somewhat out of resonance with the sending circuit and to use an instrument, such as a thermo-galvanometer, to indicate current changes in such receiving circuit, as the receiving circuit is brought toward or from resonance with the oscillating circuit by changes in capacity due to changes in the weight of the web.

Where the moving web is paper as taken off from a paper machine, it is not bone dry and its mass comprises variable amounts of moisture as well as paper material, and, of course, this moisture, having dielectric characteristics different from those of the paper materials and air, exert some influence on the capacity characteristics of the condenser of which it forms the dielectric as it passes between the condenser plates. The effects of this moisture, however, may be counteracted at least to the degree of commercial accuracy by the use of a supplemental condenser of the proper size having as a dielectric a material capable of absorbing and giving off moisture so as to contain an amount somewhat as least proportional to the moisture content of the web, and positioning this dielectric material so that it will be responsive to the moisture content of the web at a point reasonably close to that portion of the web which is passing between the plates of the main condenser. The resultant changes in capacity of this supplemental condenser are so utilized as to oppose the changes in capacity of the main condenser due to changes in amount of both paper and moisture, so as to leave effective, in determining the nearness to resonance of the two circuits, only those capacity changes due to variations in the weight of the paper. Since the capacity effects of the supplemental condenser except for those due to moisture are constant, a corresponding correction factor may be applied to the circuits so that the variable effects due to varying moisture content will alone be effective in modifying the reading on the indicator of the variations resulting from changes in capacity of the main condenser. These changes in weight of the dry paper are thus caused to present a visible indication to the machine tender, who may adjust the pulp supplying mechanism in accordance therewith. If the other conditions of the electric circuits remain substantially constant, any position of the indicator corresponds to a definite running weight of dry paper, and the indicator scale may then be calibrated directly in terms of dry paper weights. If desired, this visible indicating means may be caused to control automatically mechanism for varying the pulp supply so as to maintain the weight of paper closely within certain limits.

For a more complete understanding of this invention, reference may be had to the accompanying drawings, in which Figure 1 is a top plan of a portion of the mechanism.

Figures 2, 3 and 4 are detail sections on lines 2—2, 3—3 and 4—4, respectively, of Figure 1, Figures 2 and 3 showing in addition certain electric circuit diagrams.

Figure 5 is a detail perspective through a portion of a condenser.

Figure 6 is a detail section through a portion of the same condenser.

Figure 7 is a detail section through a portion of the moisture correction condenser.

Figure 9:
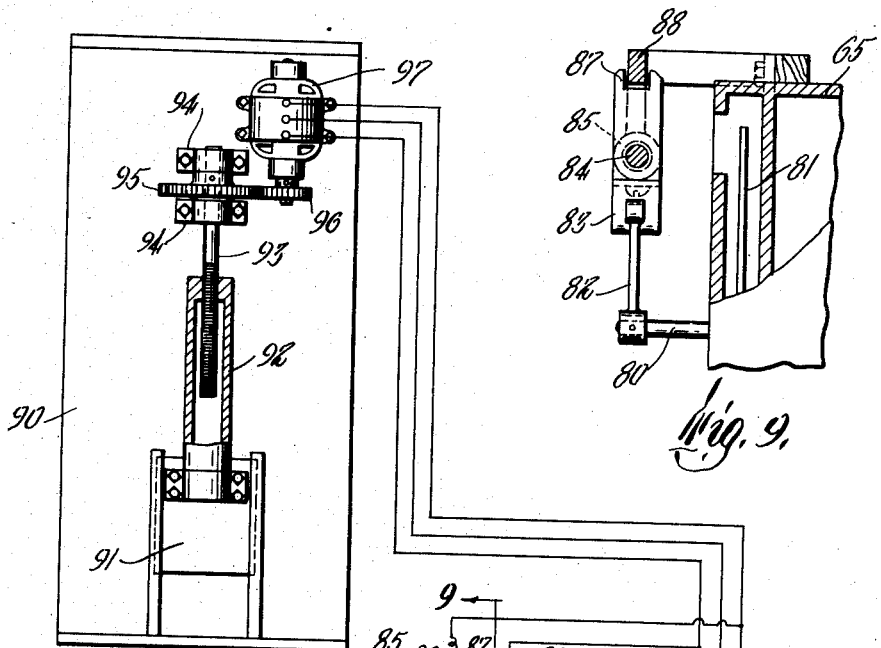
Figure 9 is a detail section on line 9—9 of Figure 8.

In order that the practical use or practice of the invention may be clearly understood I shall explain one embodiment thereof in connection with the measurement of the running weight of a material such for example, as paper, as delivered from the dry end of a paper machine, but of course the method and mechanism which are described may be employed for the measurement of other and different kinds of materials. What I have referred to as the web may, of course, be of any width and is intended to include any mass of material which may be progressively related to the measuring mechanism.

Referring first to Figures 1 to 7, at 1 is indicated a pair of spaced supporting beams, which may be angle irons, which extend across the path of a traveling web, and in the case of a paper machine may be located at any suitable point, preferably immediately after the last drier roll. The paper a extends over these beams and at one portion of its width passes above a metal plate 2 which forms one of the conductive elements of a condenser. As illustrated best in Figure 6, the plate 2 is carried by the horizontal flange 3 of each of the angle irons or supports 1 and in order that it may be capable of a slight adjustment angularly relative thereto, blocks of soft rubber or similar material 4 are introduced between it and each flange 3 and a screw 5 passing through a hole in each corner of the plate 2 extends through a rubber block 4 and is threaded into the flange 3. By means of these screws 5 the plate 2 is in electrical connection with the flanges 3 so that this condenser plate is grounded through the frame of the machine. Above the web of paper a is an upper condenser plate 10 which as shown is carried by a bracket 11 fixed to a rock shaft 12 journaled in brackets 13 fixed to the angle iron supports 1 adjacent to their ends. This plate 10 is insulated from the bracket 11 and as shown in Figure 6 this may be accomplished by passing the fastening bolt 15 through a cushion 16 of soft rubber and through an insulating bushing 17 in each of three arms 18 at the lower end of the bracket 11. On the upper face of each bearing arm 18 is a washer 19 of insulating material against which bear adjusting and lock nuts 20 and 21 threaded on the upper end of the bolt 15. By using three arms 18 a three point support for the plate 10 is produced so that adjustment of the bolts 15 provides a ready means for adjusting the plate 10 so that when the bracket 11 is lowered, the plate 10 is in parallel spaced relation to the plate 2. The lower plate could also be supported at three instead of four points from the frame supports 1. The extent to which the plate 10 may be brought toward the plate 2 may be determined by means such as an adjusting screw 25 threaded through an extension 26 of one of the arms 18 and having its lower end impinging on an extension 30 from one of the bearing brackets 13. A lock nut 31 may be employed to fix the setting of the stop screw 25.

The plate 10 may be raised to facilitate threading the paper a through the machine as shown in dotted lines in Figure 2, and for this purpose one end of the rock shaft 12 has fixed thereto a hand lever 35 which may be grasped by the operator, and swung upwardly. It is desirable that the plate 10 shall be down in its proper position while the paper machine is in operating condition and in order to insure this, while relieving the operator from the duty of holding the plate 10 elevated, and also removing the temptation to block up the plate 10 while the paper is being led into position thereunder, a dash pot mechanism may be provided as illustrated in detail in Figure 4 which will act to permit the plate 10 to return slowly to its operative position, but which will permit the operator to raise it quickly from its operative position when desired. This dash pot also has the further function of preventing vibration of the machine from jarring and disturbing the setting of the plate 10 relative to the plate 2. As shown in Figures 1 and 4, this dash pot comprises a cylinder 40 which may be pivoted as at 41 to an extension from the opposite bracket 13. Within this cylinder 40 rides a piston 42 having a small bleeder port 43 therethrough. It also has a large central port 44 therethrough which is normally closed by means of a valve 45 spring pressed into contact with a valve seat 46 at its upper end by means of a spring 47. This spring 47 reacts between the upper face of the valve 45 and a cap 48 threaded over the upper end of a valve housing 49 and having a central perforation 50 through which passes the stem 51 of the valve. To the upper end of this stem is pivoted the lower end of a link 52, the upper end of which is pivoted to an arm 53 fixed to the rock shaft 12. When the operator raises the hand lever 35, the rock shaft 12 is turned and the valve 45 is first raised from its seat, this permitting air to pass readily through the port 44, and on continued movement of the hand lever 35, the piston 42 is raised freely. As soon as the pressure on the lever 35 is released, the spring 48 seats the valve 45, thus closing the port 44, and the weight of the plate 10 and the arm 11 acts to turn the rock shaft 12 in the opposite direction and push the piston 42 downwardly within its cylinder, the air escaping from beneath through the restricted port 43. The size of this port is so proportioned that the plate 10 is held in raised position to permit ready threading of the paper therebeneath for a sufficient length of time. The weights of the parts, however, act finally to bring and hold the plate 10 in its proper spaced relation to the plate 2. The two plates 2 and 10 thus act as the conducting plates of a condenser, the dielectric therebetween comprising the paper and the air positioned between the paper and the plates. As the mass of the paper passing between the plates varies, so also varies the amount of paper material relative to the air in the dielectric and thus the electrical characteristics of the condenser are similarly varied. Means are then provided for continuously measuring certain of these characteristics of the condenser in terms of the mass of the web passing between the condenser plates, and since the plates are preferably not in contact with the web, the web may be fed therebetween not only without wear on the plates, but also without hindrance to the passage of the web, so that a continuous indication of the running weight of the web is obtainable.

The particular characteristic which is availed of in the present embodiment of this invention is capacity and this may be measured by any suitable means, but in order to provide a means sufficiently sensitive to indicate small changes in the mass of the material passing between the plates, this capacity is shown as employed to tune the frequency of an oscillating electric circuit relative to that of an oscillating circuit coupled thereto. As shown in Figure 3, the circuit tuned by this capacity is a "pick-up" or receiving circuit R coupled to an oscillatory exciting or sending circuit S. Any suitable oscillating circuit, which should for best results be as stable as possible, may be employed. As shown the circuit S is that of a low powered radio transmitter comprising a transmitting tube 50 having a filament or A battery 51 and a plate or B battery 52, the plate circuit being tuned through an inductance 53 and a variable condenser 54. At 55 is shown a coil in inductive relation to the coil 53 which is connected through a grid leak 540 with the tube grid 550. A resistance 56 is inserted adjacent to the B battery 52 as a protective device and this is shunted by means of a condenser 57 to provide a by-pass for high frequency currents. Preferably this transmitter is shielded as through the grounded shield 58 and extending outwardly of the shield is a loop 59 forming a continuation of the coil 53 and with which the receiving or pick-up circuit R is loosely coupled. This pick-up circuit comprises the coil 60 which receives the waves from the loop 59 and across this coil are shunted the variable tuning condensers 61 and 62, one of these being a vernier condenser in order that fine tuning may be accomplished. Shunted about these condensers 61 and 62 are the plates 2 and 10, and coupled in any suitable manner, as by the transformer coils 63 and 64 is a thermo-galvanometer or other current indicating instrument as 65. A thermo-galvanometer is preferably employed because of its particular suitability for the purpose, one characteristic being that it may be, and preferably is so damped that its indication represents a general average or integration of conditions while a length of, say, three or four feet, of web is passing between the condenser plates. Assuming now a suitable constant frequency in the sending circuit S, the receiving circuit R may be tuned to resonance therewith with any given value of the capacity of the condenser comprising the plates 2 and 10 with their interposed sheet material, and when this is accomplished the current flow through the receiving circuit R is at a maximum and will produce a maximum reading on the thermo-galvanometer 65. Any variation of the capacity of the condenser formed by the plates 2 and 10 and the web of paper due to change in weight of the web will cause the receiving circuit R to be thrown out of resonance with the sending circuit S so that the current flow through the receiving circuit will be decreased and a corresponding indication given on the instrument 65. The receiving circuit R may then be brought up to resonance, if desired, by varying the capacities of the condensers 61 and 62, such change evidently being a measure of the change of capacity of the plates 2 and 10 with the interposed web because of change in mass of the web.

The change in the electrical characteristics of the circuit R, proportional to a change in the weight of the moving web is accomplished by progressively relating the moving web to such circuit, as by passing it between the condenser plates, as to cause such change to take place, all without any necessary contact between such web and any element of the circuit. The result may in general terms be stated as ascertaining and indicating the weight of a moving web without touching it. Even though the web should actually touch one of the condenser plates, this has no effect in the ascertainment of the weight, because such contact is unnecessary, and is preferably avoided in order to prevent wear on the plate or plates and the consequent variation in the gap between them.

The process and apparatus as herein described are effective to measure weight of traveling material irrespective of variations in magnetic permeability or other magnetic properties, or in the total transparency or diathermancy, or its reciprocal capacity, of such material. For example, the unit area weight of paper (the cellulosic and other materials, plus moisture content) is accurately measured quite irrespective of variations in magnetic properties, color, opacity to light, sound or heat waves, polish of surface, density, or the like.

Figure 10:
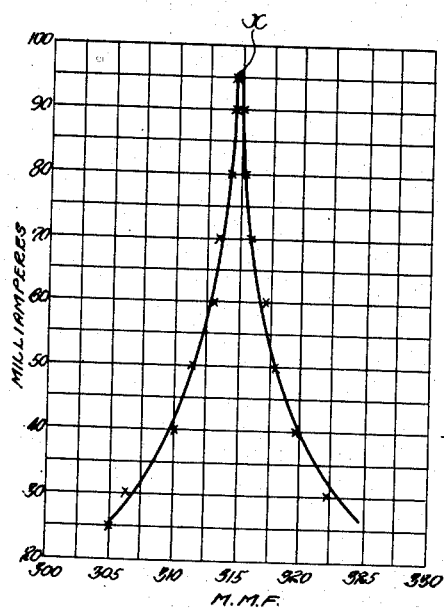
Figure 10 is a plot of a resonance curve.

In Figure 10 a resonance curve for such a type of receiving circuit is shown, it being evident from this curve that fairly small changes in wave length from the resonance point $x$ represent very considerable changes in current flow through the circuit. As, however, there is a fall of current on deviation from the resonance point $x$ in either direction so that a decrease of current does not indicate whether the tuning capacity has been increased or decreased, it is regarded as preferable to maintain the receiving circuit at one side of the resonance point $x$, whereupon an increase of current flow will show a change of capacity in one direction and decrease of the current will show a change in capacity in the other direction, the particular directions of capacity change depending on which side of the resonance point the mechanism is adjusted to operate.

It will be seen, however, that the variation in the wave length of the receiving circuit R is caused by the mass of the incompletely dried paper which passes from the paper machine; but in this case, as the moisture content in the paper is variable and also has its effect toward varying the capacity of the condenser, provision should be made for correcting for the contained moisture so that the final determination is in weight of bone dry paper. As this moisture content is variable, any correction must be made simultaneously with the indication of the weight of the web. Such a correction may be made by the use of a supplemental condenser, the electrical characteristics of which are determined and varied by the variable moisture content of the web, and preferably this correction is made by effecting the tuning of the sending circuit S in response thereto so that the reading of the instrument 65 is changed, so as to correspond to that of a less web weight than would be shown through the tuning effect of the main web condenser alone, to an amount corresponding to the weight of the moisture content of the web, with the result that the instrument 65 shows only the bone dry weight of the web between the condenser plates 2 and 10.

This supplemental condenser is shown in Figures 1, 3 and 7 and comprises a lower plate 70 carried by the bars 1 at a sufficient distance from the plates 2 and 10 to be practically out of any inductive relation thereto, and superposed above this lower plate 70 is an upper plate 71 perforated for the free passage of air. Between the plates 70 and 71 is a dielectric material 72 which is of a hygroscopic nature. Material which has been found admirably adapted for the purpose comprises artificial silk formed from reverted cellulose and a convenient form in which this may be used comprises a ribbon of such material, the ends of which are dipped in sealing wax and the intermediate portion of which is then cut in such a manner that the filler threads may be removed, leaving the warp strands extending between the waxed ends. This element may, if desired, be treated with a hygroscopic salt such as cobalt chloride to increase its sensitiveness to moisture changes. The supplemental condenser comprising the plates 70 and 71 and the hygroscopic dielectric is positioned entirely below the web $a$ which passes over guide members 75 at either side thereof which together with longitudinal guide strips 76 form a shallow receptacle having an open side across which the web of paper passes in its traverse. The hygroscopic dielectric is thus positioned adjacent to the web of paper in such manner that the moisture of the web moistens the air within the receptacle in which the supplemental condenser is placed so that the hygroscopic dielectric rapidly absorbs or gives off moisture and has a moisture content approximately proportional to the moisture content of the web. The construction and mounting of this supplemental condenser are not claimed per se in the present application for patent, but are fully described and claimed in my application for patent, Serial No. 27,326 filed May 1, 1925, for method and mechanism for determining the moisture content of paper. This supplemental condenser is so designed that the capacity thereof, due to the moisture content of the hygroscopic dielectric, is sufficient to counteract in the instrument reading that portion of the capacity of the main condenser (comprising the plates 2 and 10 and the web passing therebetween) which is due to the presence of moisture within the web. The final adjustment for this correction may be obtained by employing a hygroscopic dielectric slightly too large for the purpose and then removing as much as may be indicated as necessary in practice as a result of tests of "tear-outs" weighed as taken from the sheet and also when bone dry. After having once been adjusted, however, hygroscopic dielectric needs no further attention. As the plates 71 and 72 are of fixed areas and their distance apart unvariable and the dielectric changes are due solely to acquisition or giving up of moisture, the only variable capacity effects arise from the moisture changes. The plates 70 and 71 of this supplemental condenser are shunted about the condenser 54 of the sending circuit S to vary the frequency of this circuit, the indication of the instrument 65 being determined by the closeness to resonance of this circuit S to the pick-up circuit R.

Since by proper attention to the circuits the only variables to be considered arise from changes in the dry paper material, the instrument 65 may be calibrated directly in weights of bone dry paper.

Figure 8:
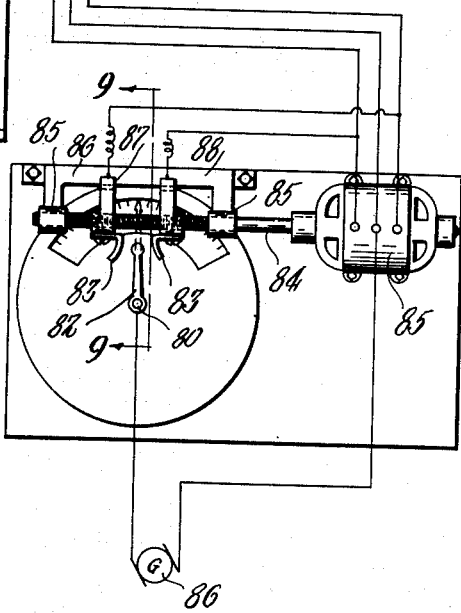
Figure 8 is a somewhat diagrammatic representation of an automatic pulp supply control.

With this mechanism, therefore, it will be seen that the operator may have at hand a constant indication of the running bone dry weight of the paper substantially irrespective of its caliper and if this weight is not sufficiently close to that desired, he may regulate by any suitable means, the supply of pulp to the web-forming mechanism. If it is desired to do so this mechanism may be coupled to a device for controlling the supply of pulp to the web-forming mechanism automatically. Such a device has been shown somewhat diagrammatically in Figures 8 and 9. Referring to these figures, it will be seen that the shaft 80 of the indicator pointer 81 of the instrument 65 may carry a contact arm 82, which on the swinging of the pointer 81 beyond desired limits, impinges on one or the other of a pair of contact shoes 83 having threaded connection with a shaft 84. This shaft is journaled in a bearing 85 on a support 86 and the contact shoes 83 have guide portions 87 straddling a central portion 88 of the support 86 in order to prevent these shoes from rotating with the shaft 84. This shaft 84 is rotated by means of a motor 85 which receives its current supply from any suitable source as 86. At 90 is indicated a flow box having a gate 91 for controlling the supply of pulp to the web-forming mechanism (not shown) of the paper machine. As more or less conventionally illustrated, the gate 91 has fixed thereto a sleeve 92 which has threaded engagement with a shaft 93 journaled in bearings 94 on one side of the flow box. Between these bearings a gear 95 is fixed to the shaft 93 and meshing therewith is a pinion 96 on the shaft of a motor 97. If now the indicator pointer 81 swings to a point sufficiently away from that at which it represents the weight of the paper which it is desired to produce, to contact with either of the shoes 83, the motors 85 and 97 are energized simultaneously, the motor 97 to move the gate 91 in a direction to supply more or less pulp to the web-forming mechanism as may be necessary to establish a correction in the weight of paper being formed and the motor 85 to move the contacts 83 in the same direction as the arm 82 so that they break contact therewith, thus interrupting the supply of current to the motors. If the correction of the gate 91 is insufficient to correct the tendency to under or over weight of the paper, the arm 82 moves further in the same direction and strikes the same contact 83, whereupon a further movement of the gate 91 in the same direction and a further movement of the contacts 83 to break the electrical connection is made. In case the correction is more than sufficient to produce the desired weight of paper, the pointer 81 swings in the opposite direction, bringing the contact arm 82 into electrical connection with the opposite contact 83, whereupon the motor 93 is operated to move the gate 91 in the reverse direction and the contacts 83 are moved in a direction to break the contact with the arm 82. In this manner the operation of the gate 91 is so controlled that the supply of pulp is automatically regulated to effect the formation of paper of the desired weight within reasonably close limits.

While the application of the present invention to measurement of the running weight of paper, where there is also the problem of moisture correction, has been specifically described, it is evident that this invention might also be applicable to the measurement of the running weight of other material, as, for example, rubber, or fibrous sheet material or fabric saturated with various agents such as rubber or other waterproofing or dielectric compounds, linoleums and other sheeted materials, with many of which no moisture correction would be necessary.

Having thus described certain embodiments of this invention, it should be understood that various changes and modifications might be made therein and that the invention may be embodied in various other forms and practiced in other ways without departing from the spirit or scope of the invention as defined by the appended claims.

I claim:

1. The method of determining the weight per unit of area of sheet material, which comprises relating a portion thereof of predetermined area to a high frequency electric circuit in a manner to cause the sheet material to exert a variation in the frequency of such circuit proportional in amount to the weight of such portion, and determining the amount of such variation.

2. The method of determining the weight per unit of area of sheet material, which comprises relating thereto means which together therewith have electrical characteristics dependent in amount on such weight only, and determining the amount of such characteristics.

3. The method of determining the weight of certain constituents in the unit area of a sheet, which comprises associating with said sheet means which together with said material have electrical characteristics dependent in amount on such weight of said constituents, and determining the amount of such characteristics.

4. The method of determining the weight per unit of area of certain constituents of sheet material of indeterminate length, which comprises progressively relating said material along its length to means which together but without necessity of contact therewith have electrical characteristics dependent in amount on such weight of said constituents, and continuously indicating such amount.

5. The method of determining the weight per unit of area of certain constituents of sheet material of indeterminate length, which comprises progressively relating said material in portions of definite area to means which together but without the necessity of contact therewith have electrical characteristics dependent in amount on the amount of such constituents in such portions, and continuously indicating such amount.

6. The method of determining the unit weight of sheet material which comprises placing such material between spaced electro-conductive plates which are spaced apart a predetermined distance, and measuring the electrical capacity of the condenser thus formed in terms of sheet material weight.

7. The method of determining the unit weight of a web of sheet material which comprises placing such material between a pair of spaced electro-conductive plates, tuning an oscillatory electric circuit by the capacity of such plates and web, and indicating in terms of web weight the frequency changes caused by the presence of said web between said plates.

8. The method of determining the weight of dry material per unit area in a web of indeterminate length which comprises progressively associating with said web means which together with that portion of the web associated therewith at any instant possesses electrical characteristics proportional in amount to the running weight of said web, progressively subjecting to said web other means having similar electrical characteristics proportional in amount to the amount of moisture present in that portion of the web subjected to said other means at any instant, and continuously determining the amount of such electrical characteristics of said first means corrected for moisture content by the amount of such electrical characteristics of said other means.

9. The method of determining the unit running weight of dry paper in a moist web as formed on a paper making machine, which comprises passing said web continuously between spaced electro-conductive elements, subjecting to said web a condenser having a dielectric responsive in its dielectric qualities to the moisture in said web, and continuously indicating in terms of weight of dry paper the capacity of said elements and web corrected for moisture content by the capacity of said condenser.

10. The method of determining the running weight of dry paper in a moist web, which comprises running said web between a pair of spaced plates and into active relation to a condenser having a dielectric responsive in its moisture content to the moisture content in said web, tuning the frequency of a pick-up oscillatory electric circuit by means of the capacity of said plates and web, tuning the frequency of a coupled oscillatory circuit by the capacity of said condenser, said condenser being so proportioned relative to said plates as to impart the correction factor to the capacity of said plates and web corresponding to the capacity effects of the moisture in said web between said plates, and measuring the current flow in said pick-up circuit produced by its nearness to resonance with said coupled circuit in terms of the running weight of dry paper.

11. The method of determining the unit weight of dry paper in a moisture sheet which comprises placing a portion of such sheet between spaced electro-conducting elements, subjecting to an adjacent portion of said sheet a condenser having a dielectric responsive in its dielectric proportions to the moisture in said sheet, and determining in terms of weight of dry paper the capacity of said elements and web corrected for moisture content by the capacity of said condenser.

12. The method of determining the weight of dry material per unit area in moist sheet material, which comprises associating said sheet with means which together therewith has electrical characteristics dependent in amount on the weight per unit area of said moist sheet, subjecting to said sheet other means having similar electrical characteristics and responsive as to the amount of such characteristics to the amount of such moisture, and determining in terms of running weight of dry material the differences in the amounts of such characteristics of said two means.

13. The method of controlling the running dry weight of a web of paper as formed on a paper machine, which comprises continuously indicating the running weight of the web as formed corrected for moisture content, and controlling the supply of pulp to the web-forming mechanism in accordance with such indication.

14. A method of determining a given characteristic of sheet material, which comprises passing said sheet progressively between condenser plates of predetermined area and spacing, and continuously measuring the electrical capacity of the condenser thus formed in terms of such characteristic of said material.

15. A method of determining the unit area weight of sheet material, which comprises passing said sheet progressively in such relation to a high frequency electric current as to vary an electrical characteristic of such current proportionally to the variations in the weight of such material, and indicating the variations of said electrical characteristic.

16. A method of determining the unit area weight of material, which comprises passing such material progressively between condenser plates of predetermined area and unvaried spacing, thereby varying the capacity of the condenser thus formed, and continuously measuring the capacity of such condenser in terms of weight as the material progresses between said plates.

17. The method of continuously determining a selected characteristic of a web of material, which comprises progressively passing such material between a pair of invariably spaced electro-conductive plates, tuning an oscillatory circuit by the capacity of such plates and web, and continuously indicating the frequency changes caused by the presence of that portion of the web which is passing between said plates.

18. A method of weighing unit areas of a traveling material, which comprises causing variations, proportional to variations in weight of such material irrespective of variations in total transparency or diathermancy of said material, in an electric circuit by progressively relating the material thereto without necessary contact with any portion of the elements comprising such circuit, and continuously indicating such variations.

19. The method of determining the running weight of material which comprises progressively relating said material to means which together with such material have electrical characteristics dependent in amount on the weight of that portion of the material related to such means at any instant, and continuously indicating the amount of such characteristic as the material is moved.

20. The method of determining the weight per unit area of a traveling material, which comprises progressively passing said material in such relation to an electrical means as to vary the electrical characteristics of such means in proportion to the variations in weight of such material irrespective of variations in total transparency or diathermancy of said material, and automatically and continuously indicating the variations of such electrical characteristic in terms of weight.

21. The method of determining the amount of a characteristic of a material, which comprises causing such material to determine by the amount of such characteristic the relative frequencies of two oscillatory electric currents on one side of resonance with each other, and measuring the difference in frequency between such currents in terms of the desired characteristic.

22. The method of determining the amount of a characteristic of a material, which comprises causing one oscillatory current of electricity to induce another oscillatory current, causing such material to determine by the amount of such characteristic the relative frequencies of said oscillatory electric currents on one side of resonance with each other, and measuring the induced current in terms of such characteristic.

23. The method of measuring the weight of certain constituents only of a material, which comprises causing all the constituents of the material to determine the frequency of an oscillatory electric current, causing the constituents other than said certain constituents to determine the frequency of another oscillatory electric current, and measuring the differences of the frequencies in said currents in terms of the weight of the desired constituents.

24. The method of measuring the weight of certain constituents only of a material, which comprises causing one oscillatory current of electricity to induce another oscillatory current, causing all the constituents of the material to determine the frequency of one of the oscillatory electric currents, causing the constituents other than said certain constituents to determine the frequency of the other oscillatory electric current, and measuring said induced current in terms of the weight of the desired constituents.

25. In a machine of the class described, a pair of spaced electro-conducting elements, means for passing a web therebetween and out of contact therewith, and means responsive to electrical characteristics of said elements and web for indicating the running weight of said web.

26. In a machine of the class described, a pair of spaced electro-conducting elements, means for passing a web therebetween, said elements and web thus comprising a condenser having electrical characteristics partly determined in amount by the running weight of said web, a supplemental condenser having a moisture responsive dielectric subjected to said web to partly determine in amount the electrical characteristics of said supplemental condenser in accordance with the moisture content of said web, and means for measuring the electrical characteristics of said elements and web corrected by corresponding characteristics of said supplemental condenser in terms of the running weight of dry web material.

27. In a machine of the class described, web-forming mechanism, means for supplying pulp to said mechanism, mechanism having electrical characteristics dependent in amount of the running weight of said web substantially irrespective of its caliper and means for automatically controlling said pulp supplying means in accordance with the amount of such characteristics.

28. In a machine of the class described, web-forming mechanism, means for supplying pulp to said mechanism, mechanism having electrical characteristics dependent in amount on the running weight of pulp in said web corrected for moisture content and means for automatically controlling said pulp supplying means in accordance with the amount of such characteristics.

29. In a machine of the class described, a high frequency oscillatory electric circuit, means for feeding a web, means depending in value on the running weight of said web for effecting a control of the frequency of said circuit, and means responsive to such frequency for indicating such running weight.

30. In a machine of the class described, a high frequency oscillatory electric circuit, means for feeding a web, means depending in value on the running weight of dry pulp in said web for affecting said circuit, and means responsive to such effect for indcating such running weight.

31. In a machine of the class described, means for feeding a web, means dependent in value on the running weight of said web substantially irrespective of its caliper, and means responsive to the value of such dependent means for indicating said running weight.

32. In a machine of the class described, web-forming mechanism, means for supplying pulp to said mechanism, a pair of spaced electro-conducting elements, means for passing the web of paper between such elements, means for measuring electrical characteristics depending in amount on the running weight of the web between said elements, and means for controlling said pulp supply means in accordance with such measurements.

33. In a machine of the class described, web-forming mechanism, means for supplying pulp to said mechanism, means having electrical characteristics dependent in amount on the running weight of said web, means having similar electrical characteristics dependent in amount on the amount of moisture in said web, and means for measuring in terms of running weight the amount of such characteristics due to the weight of said web diminished by the amount of said characteristics due to the moisture in said web.

34. In a machine of the class described, web-forming mechanism, means for supplying pulp to said mechanism, means having electrical characteristics dependent in amount on the running weight of said web, means having similar electrical characteristics dependent in amount on the amount of moisture in said web, and means for controlling said supplying means in accordance to the amount of such characteristics due to the running web weight diminished by the amount of such characteristics due to moisture.

35. In an apparatus of the class described, a lower electro-conducting plate over which a web of sheet material may be passed, an upper plate movable to and from a position over said web and above said lower plate, means for retarding the movement of said upper plate, and means for rendering said retarding means ineffective actuable to move said upper plate from such position.

36. In an apparatus of the class described, an electro-conducting lower plate over which a web of paper may be passed, an arm pivoted above said lower plate, an upper plate carried by said arm and movable on the swinging of said arm between a raised position and a lowered position over said web and above said lower plate, a dash pot for retarding movement of said upper plate, and means actuable to render said dash pot ineffective to retard such movement and then to raise said upper plate.

37. In an apparatus of the class described, a metal supporting frame, a lower plate, a compressible member between said lower plate and frame, fastening elements extending between said frame and plate and independently adjustable to compress said members, whereby the plane of said plate relative to said members may be adjusted, an upper plate, and means for supporting said upper plate adjustably spaced from said lower plate, and with the plane of its lower face adjustable relative to said lower plate.

38. In combination with a paper machine having web forming mechanism, and a pulp supplying mechanism having flow controlling gate, and a motor for moving said gate, of an arm movable in response to variations in the weight of the web as formed by said forming mechanism, a pair of spaced contacts between which said arm moves, a motor for moving said contacts together in either direction, and connections between said arm, contacts and motors, such that movement of said arm into electrical connection with either of said contacts energizes said motor to move said gate in a direction to effect a change of web weight to move said arm out of such connection and to move said contacts in a direction to interrupt such connection.

39. A mechanism of the class described comprising means having characteristics responsive in amount to the running weight of sheet material, means having similar characteristics responsive in amount to the running weight of certain constituents only in said material, and devices responsive to the amount of such characteristics of both of said means for indicating the running weight of the remaining constituents of said sheet.

40. In combination, means with which a moving material may be progressively associated, said means, being responsive, while out of contact with said material, to the mass of that portion of the material associated therewith at any instant irrespective of variations in total transparency, diathermancy or magnetic permeability of said material, and means for continuously indicating the response of said means.

41. The method of determining the amount of certain constituents of material, which comprises measuring electrical characteristics due to all of the constituents diminished by the same electrical characteristics due to the remainder of the constituents of said material.

42. The method of determining the unit weight of dry material in a moist web, which comprises placing a portion of said web between spaced electro-conducting elements, and determining in terms of weight of material the capacity of said elements and web diminished by the capacity due to the moisture content of said web.

In testimony whereof I have affixed my signature.

ALBERT ALLEN.